D. B. Lucky.
Mower.
N° 44,259. Patented Sep. 13, 1864.
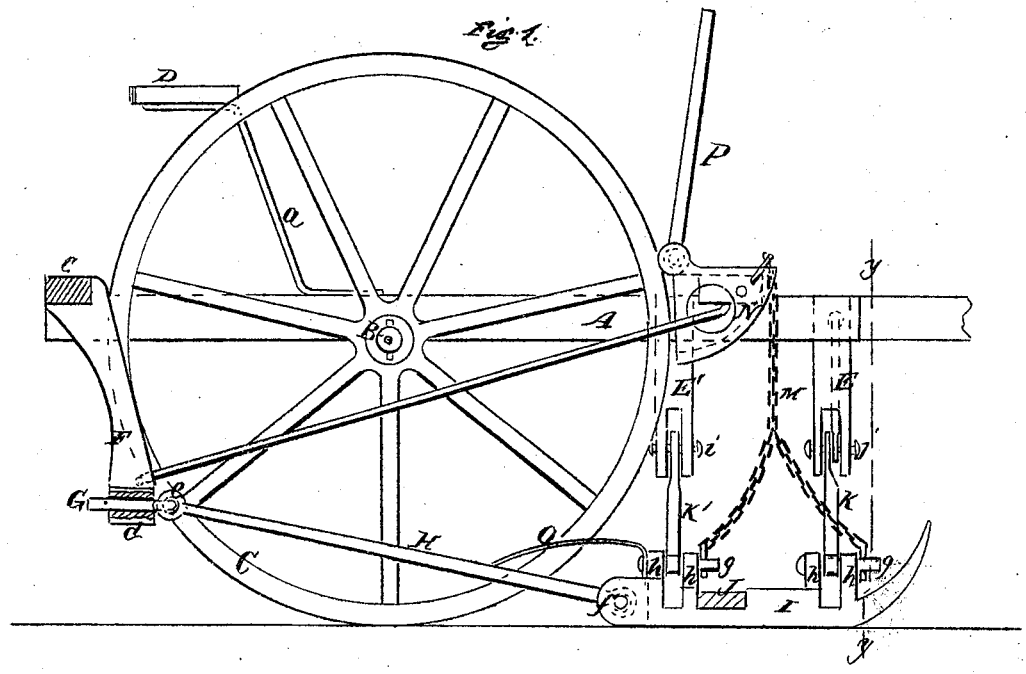
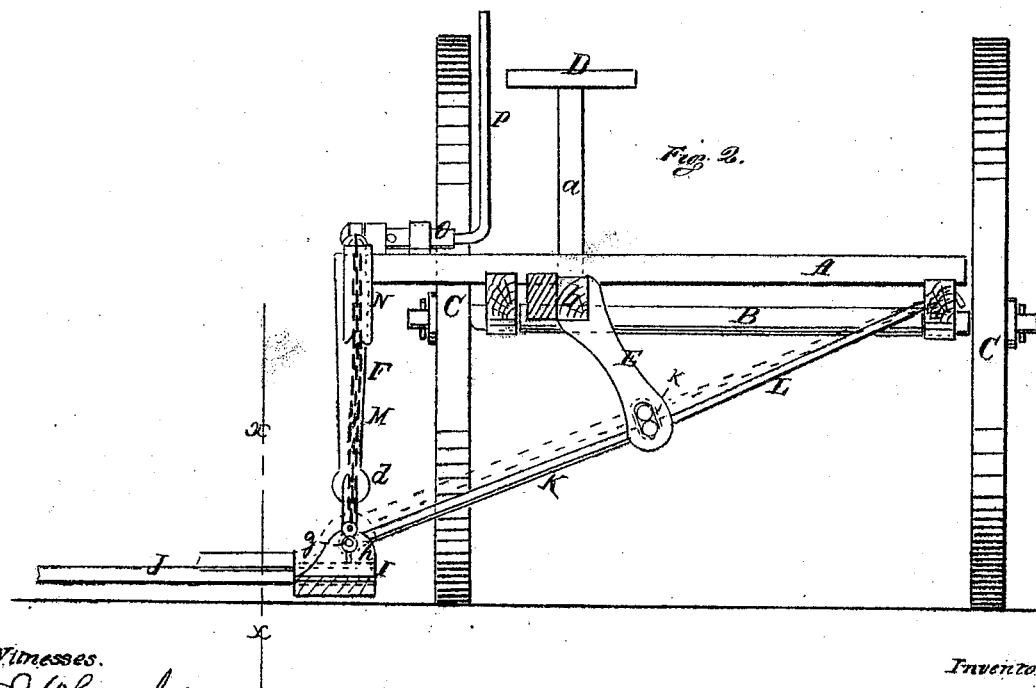
Witnesses.
J. W. Coombs
G. W. Reed
Inventor.
D. B. Lucky
per Munn & Co.
atty.

UNITED STATES PATENT OFFICE.

D. B. LUCKEY, OF BLOOMINGBURG, ASSIGNOR TO D. B. LUCKEY, OF SAME PLACE, AND S. S. BOARDMAN, OF ROCHESTER, NEW YORK.

IMPROVEMENT IN HARVESTERS.

Specification forming part of Letters Patent No. 44,259, dated September 13, 1864.

*To all whom it may concern:*

Be it known that I, D. B. LUCKEY, of Bloomingburg, in the county of Sullivan and State of New York, have invented certain new and useful Improvements in Grain and Grass Harvesters; and I do hereby declare that the following is a full, clear, and exact description thereof, which will enable any person skilled in the art to make and use the same, reference being had to the accompanying drawings, making a part of this specification, in which—

Figure 1 is a side view of my invention, the cutter-bar being in section, as indicated by the line $x\,x$, Fig. 2; Fig. 2, a front sectional view of the same, taken in the line $y\,y$, Fig. 1.

Similar letters of reference indicate the same parts.

This invention relates to a new and improved grain and grass harvesting machine of that class in which the cutter-bar is connected to the machine by a joint to admit of the cutter-bar rising and falling freely to conform to the inequalities of surface over which it may pass, and also to admit of its being turned up out of the way when the machine is not in use or when it is being drawn from place to place.

The object of the invention is to obtain a grain and grass harvester of the class specified which will be strong and durable, admit of the cutter-bar working freely to conform to the undulating surface of the ground, and which will also admit of the guards and front edge of the cutter-bar rising in case of meeting with any obstruction, so that it may readily pass over it.

A represents a rectangular frame, which is mounted upon an axle, B, having a wheel, C, upon each end of it.

D is the driver's seat, placed upon a support, $a$, which is secured to the framing.

E E' are two pendants, which extend downward in a slightly-oblique position from a longitudinal bar, $b$, of the framing, one pendant being a short distance in front of the other, as shown clearly in Fig. 1.

To the rear cross-bar, $c$, of the frame A, at its right-hand end, there is attached a pendant, F. This pendant is at the outer side of the right-hand wheel C, and it is provided at its lower end with a tube, $d$, in which a small shaft, G, is placed and allowed to turn freely. To the front end of this shaft G a rod, H, is connected by a universal joint, $e$, which may be formed simply of two eyes or links fitted one within the other, and the front end of the rod H is connected by a joint, $f$, with the rear part of a shoe, I, said joint $f$ admitting of the shoe working up and down or vertically.

To the shoe I the cutter-bar J is attached at right angles, and the shoe is connected to the pendants E E' by means of rods K K', pins $g$ passing through the rods and through lugs $h$, on the shoe to form joints. The rear rod, K', is fitted in the rear pendant, E', by means of a pin, $i$, forming an ordinary joint; but the front rod, K, is secured in the front pendant, E, by means of a pin, $j$, passing through an oblong slot, $k$, to admit of a certain degree of play of said pin, as will be fully understood by referring to Fig. 2. The pin $j$ has a light rod, L, connected to it, the outer end of which is attached to the left-hand side of the framing A.

The shoe I is connected by a chain, M, to a segment, N, the latter being on a shaft, O, at the front part of the framing, and the former provided with a lever, P, by actuating which the shoe and cutter-bar may be raised above the surface of the ground when desired.

From the above description it will be seen that the cutter-bar is braced in a thorough manner, the rods H K K' firmly holding the shoe in position, while they admit of the following important results, viz: first, of the cutter-bar rising and falling to conform to the inequalities of the surface of the ground over which it may pass; second, of the cutter-bar being turned upward in a vertical position when the machine is being drawn from place to place; and, third, in allowing the front part of the shoe and cutter-bar to rise, in order that it may pass over obstructions. This latter movement, it will be seen, is allowed in consequence of the pin $j$ of the front rod, K, working in the oblong slot $k$ of the front pendant, E. The two first-described movements have been previously obtained; but the cutter-bar has not been well braced, and the machines are liable to give away. In consequence of having two rods, K K', attached to the shoe the latter is prevented from being swayed laterally either to the right or left, while the rod H serves as an effectual stay at the rear of the shoe and without at all interfering with the movements of the shoe and cutter-bar. The rod L prevents the pin $j$ from binding in the slot $k$ of the pendant E, thereby obviating friction and admitting of a free vertical play of the outer end of the rod K.

I would remark that a spring, Q, may be attached to the back part of the shoe I, to bear upon the rod H and prevent an unnecessary shaking of the front part of the shoe and cutter-bar.

I would further remark that I do not confine myself to the use of two rods, K K', for more may be employed if necessary or desired, although I think two would be sufficient.

Having thus described my invention, what I claim as new, and desire to secure by Letters Patent, is—

1. The rod H, attached at its front end to the rear of the shoe I by a joint, $f$, and connected at its back end by a universal joint, $e$, to a shaft, G, fitted loosely in a tube or bearing, $d$, at the lower end of a pendant, F, at the rear of the frame A, substantially as and for the purpose set forth.

2. The connecting of the shoe I to the frame by means of two or more rods, K K', one or more of which is allowed a vertical play at its outer end by having its pin $j'$ fitted in an oblong slot, $k$, in the pendant in which it is secured, to admit of the rising and falling of the front part of the shoe and cutter-bar, as herein described.

3. The connecting of the pin or pins $j$, which are allowed the rising and falling movement, to the frame A, by means of a rod or rods L, to prevent friction which would otherwise attend the working of the pin or pins $j$ in their slots.

D. B. LUCKEY.

Witnesses:
M. M. LIVINGSTON,
GEO. W. REED.